(12) United States Patent
Utagawa et al.

(10) Patent No.: US 8,254,675 B2
(45) Date of Patent: Aug. 28, 2012

(54) IMAGE PROCESSING APPARATUS, IMAGING APPARATUS AND IMAGE PROCESSING PROGRAM

(75) Inventors: Ken Utagawa, Yokohama (JP); Masaru Muramatsu, Kawasaki (JP); Tsuyako Matsushita, Yokohama (JP)

(73) Assignee: Nikon Corporation, Tokyo (JP)

( * ) Notice: Subject to any disclaimer, the term of this patent is extended or adjusted under 35 U.S.C. 154(b) by 1004 days.

(21) Appl. No.: 12/222,016

(22) Filed: Jul. 31, 2008

(65) Prior Publication Data

US 2009/0041350 A1 Feb. 12, 2009

(30) Foreign Application Priority Data

Aug. 6, 2007 (JP) ................................. 2007-203847

(51) Int. Cl.
*G06K 9/00* (2006.01)
(52) U.S. Cl. ....................................... 382/169; 382/254
(58) Field of Classification Search .................. 382/169, 382/254, 274
See application file for complete search history.

(56) References Cited

U.S. PATENT DOCUMENTS

| | | | | |
|---|---|---|---|---|
| 7,599,578 B2* | 10/2009 | Utagawa | ....................... | 382/276 |
| 7,949,201 B2* | 5/2011 | Suzuki | ........................... | 382/274 |
| 2003/0053690 A1* | 3/2003 | Trifonov et al. | ............. | 382/168 |
| 2006/0062562 A1 | 3/2006 | Utagawa | | |
| 2007/0013782 A1* | 1/2007 | Kobayashi | ............... | 348/207.99 |
| 2007/0248282 A1* | 10/2007 | Suzuki | .......................... | 382/282 |

FOREIGN PATENT DOCUMENTS

| | | |
|---|---|---|
| JP | B2-2663189 | 6/1997 |
| JP | A-2006-114005 | 4/2006 |
| JP | A-2006-114006 | 4/2006 |
| JP | A-2006-166320 | 6/2006 |

OTHER PUBLICATIONS

Nov. 22, 2011 Office Action issued in Japanese Patent Application No. 2007-203847 (w/translation).

* cited by examiner

*Primary Examiner* — Stephen R Koziol
(74) *Attorney, Agent, or Firm* — Oliff & Berridge, PLC

(57) ABSTRACT

A white-balance imaging apparatus includes a first gradation converting unit performing gradation conversion depending on each pixel value of an original image, a second gradation converting unit performing gradation conversion based on pixel values within a predetermined range from each pixel of the original image, a selecting unit selecting a gradation conversion mode, and a determining unit determining second gradation conversion parameters for use by the second gradation converting unit, according to the selected gradation conversion mode, and determining at least one of first gradation conversion parameters for use by the first gradation converting unit and an exposure amount in an exposure amount adjusting part which can adjust the exposure amount, according to the selected gradation conversion mode. Therefore, it is possible to correct the dark area gradation of an image while maintaining brightness of the whole image, and to realize preferable gradation conversion.

24 Claims, 8 Drawing Sheets

IMAGE PROCESSING APPARATUS, IMAGING APPARATUS AND IMAGE PROCESSING PROGRAM

CROSS-REFERENCE TO RELATED APPLICATION

This application is based upon and claims the benefit of priority from Japanese Patent Application No. 2007-203847, filed on Aug. 6, 2007, the entire contents of which are incorporated herein by reference.

BACKGROUND

1. Field

The present embodiments relate to an image processing apparatus, an imaging apparatus including the same, and an image processing program.

2. Description of the Related Art

Conventionally, there has been known a phenomenon that dark area gradation of image data is blacked out by shooting a subject having large difference in brightness. Therefore, inventions of Patent Document 1 (Japanese Patent No. 2,663,189) has improved black-out of the dark area gradation by performing gradation conversion that increases gain of the dark area gradation.

However, in the above mentioned inventions of Patent Document 1, along with the above mentioned gradation conversion that increases the gain of the dark area gradation, impression of the whole image will also be lighter. As a result, there has been a problem in that impression of brightness has differed between an image which is subjected to gradation conversion that increases the gain of the dark area gradation and an image which is not subjected to the gradation conversion, thereby providing odd feeling to a user.

SUMMARY

A proposition is to correct dark area gradation of an image while maintaining lightness of the whole image and to realize preferable gradation conversion.

In order to achieve the above-mentioned proposition, an image processing apparatus includes an inputting part inputting an original image, a first gradation converting part performing gradation conversion on the original image, depending on each pixel value of the original image, a second gradation converting part performing gradation conversion on the original image, based on pixel values within a predetermined range from each pixel of the original image, a selecting part selecting any gradation conversion mode from among a plurality of predetermined gradation conversion modes, and a determining part determining a second gradation conversion parameter for use in gradation conversion by the second gradation converting part, according to the gradation conversion mode selected by the selecting part, and determining at least one of a first gradation conversion parameter for use in gradation conversion by the first gradation converting part and an exposure amount in an exposure amount adjusting unit which can adjust the exposure amount, according to the gradation conversion mode selected by the selecting part.

In addition, the determining part may determine the second gradation conversion parameter and the first gradation conversion parameter, according to the gradation conversion mode selected by the selecting part.

Moreover, the determining part may determine the second gradation conversion parameter, the first gradation conversion parameter, and the exposure amount, according to the gradation conversion mode selected by the selecting part.

Moreover, the selecting part may select any gradation conversion mode from among a plurality of gradation conversion modes, based on the subject image of the original image.

Moreover, the second gradation converting part may perform gradation conversion using a gain curve, and the determining part may determine the gain curve as the second gradation conversion parameter.

Moreover, the first gradation converting part may perform gradation conversion on the original image input from the inputting part or an image made up of a plurality of color components based on the original image and generate a second image, depending on each pixel value of the original image or the image made up of a plurality of color components based on the original image, and the second gradation converting part may perform gradation conversion on the second image or a linearly-transformed image of the second image and generate a third image, based on pixel values within a predetermined range from each pixel of the second image or the linearly-transformed second image.

Moreover, the second gradation converting part may perform gradation conversion on the original image input from the inputting part or a linearly-transformed image of the original image and generate a second image, depending on pixel values of the original image or the linearly-transformed original image, and the first gradation converting part may perform gradation conversion on the second image or an image made up of a plurality of color components based on the second image and generate a third image, based on pixel values within a predetermined range from each pixel of the second image or the image made up of a plurality of color components based on the second image.

An imaging apparatus includes any image processing apparatus of the above-mentioned image processing apparatuses, and an exposure amount adjusting part which can adjust the exposure amount, where the determining part determines the second gradation conversion parameter and the exposure amount in the exposure amount adjusting part, according to the gradation conversion mode selected by the selecting part.

Another imaging apparatus includes any image processing apparatus of the above-mentioned image processing apparatuses, wherein the determining part determines the second gradation conversion parameter and the first gradation conversion parameter, according to the gradation conversion mode selected by the selecting part, the first gradation converting part performs gradation conversion using the first gradation conversion parameter determined by the determining part, and the second gradation converting part performs gradation conversion using the second gradation conversion parameter determined by the determining part.

In addition, an image processing program to realize an image processing with respect to a target image to be processed, in which the configuration regarding the above invention is expressed by converting the configuration into the program, is also effective as a specific embodiment.

DETAILED DESCRIPTION OF THE EMBODIMENTS (First Embodiment)

Hereinafter, a first embodiment will be described using drawings. In the first embodiment, an example of the imaging apparatus will be described using an electronic camera.

Figure 1:
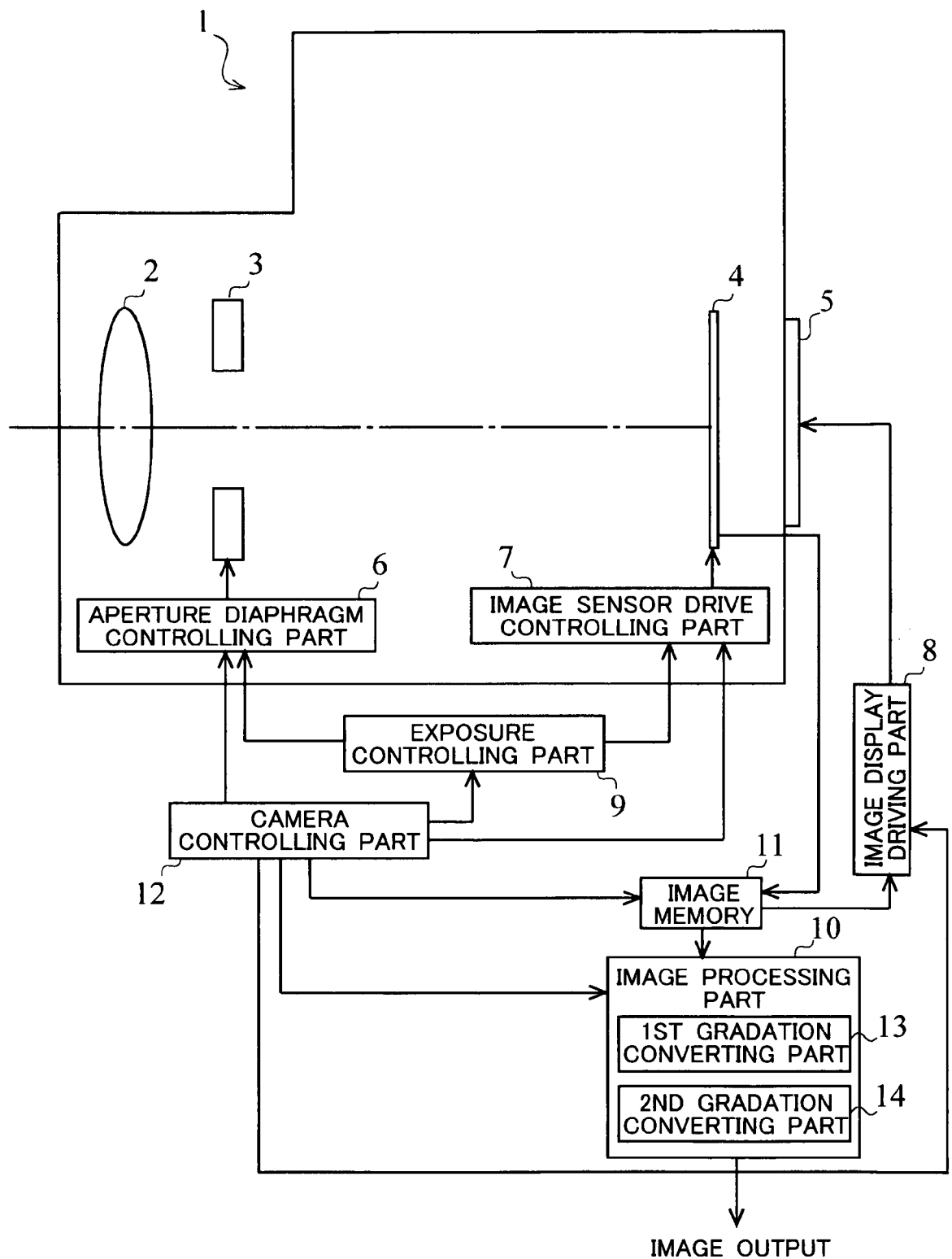
FIG. 1 is a view illustrating a configuration of an electronic camera 1 in accordance with a first embodiment.

FIG. 1 is a view illustrating the configuration of an electronic camera 1 of the present embodiment. As illustrated in FIG. 1, the electronic camera 1 includes a photographic lens 2, an aperture diaphragm 3, an image sensor 4, and an image displaying part 5. Moreover, the electronic camera 1 includes an aperture diaphragm controlling part 6 which controls the aperture diaphragm 3, an image sensor drive controlling part 7 which performs drive control of the image sensor 4, an image display driving part 8 which drives the image displaying part 5, an exposure controlling part 9, an image processing part 10, and an image memory 11, and also includes an camera controlling part 12 which controls each of the parts in the electronic camera 1. The camera controlling part 12 includes an unillustrated memory inside thereof, and records a program for controlling each of the parts in advance. Moreover, the electronic camera 1 includes an operating member, such as an unillustrated release button or a selection button, and the camera controlling part 12 detects user's operation for the operating member.

In FIG. 1, the output of the image sensor 4 is coupled to the image memory 11, and the output of the image memory 11 is coupled to the image display driving part 8 and the image processing part 10. Moreover, to the aperture diaphragm controlling part 6 and the image sensor drive controlling part 7, information indicating shooting conditions which will be described later, is supplied from the exposure controlling part 9.

The electronic camera 1 having the configuration illustrated in FIG. 1 has a live-view mode in which a shooting image plane is read out by way of interlaced scanning and displayed, and a still-image photographing mode in which the whole shooting image plane is read out.

In the live-view mode, by controlling the image sensor drive controlling part 7, the camera controlling part 12 starts so-called interlaced reading from the image sensor 4, based on the photographing start instruction from a user. The camera controlling part 12 saves in the image memory 11 the output read out from the image sensor 4 by way of interlaced reading, and controls the image display driving part 8 to display an image on the image displaying part 5.

Moreover, by controlling the exposure controlling part 9, the camera controlling part 12 controls exposure using the image of an output which is read out by way of interlaced reading. The exposure controlling part 9 divides an image plane into, for example, a total of 25 blocks made up of five vertical divisions and five horizontal divisions, obtains the average amount of light for every block, and determines a proper exposure amount using the average value, the maximum value, the minimum value, and the like of the 25 outputs. Then, the exposure controlling part 9 determines an aperture value and an exposure time according to the determined proper exposure amount. Since a specific method for determining exposure by way of such multi-photometry is the same as that of a known technology, description thereof will be omitted. Moreover, the number of divided blocks for determining the exposure amount is not limited to the above-mentioned example. In addition, when the electronic camera 1 has modes with regard to exposure control, such as an aperture priority mode, a shutter speed priority mode, and a program mode, the exposure controlling part 9 determines the above-mentioned proper exposure amount according to a set mode.

Then, the exposure controlling part 9 supplies the determined aperture value to the aperture diaphragm controlling part 6 as information indicating shooting conditions, and supplies the determined exposure time to the image sensor drive controlling part 7 as information indicating shooting conditions. The aperture diaphragm controlling part 6 controls an aperture mode of the aperture diaphragm 3 at the time of still-image photographing based on the aperture value supplied from the exposure controlling part 9. Moreover, the image sensor drive controlling part 7 controls the exposure time of the image sensor 4 at the time of still-image photographing based on the exposure time supplied from the exposure controlling part 9. In addition, when the image sensor 4 has an electronic shutter function, the above-mentioned control of the exposure time is performed using the electronic shutter function. Moreover, when the image sensor 4 does not have the electronic shutter function, or when inclusion of light at a time other than the exposure time is strictly forbidden, a mechanical shutter member may be provided at the side of photographic lens 2 of the image sensor 4 so that the above-mentioned control of the exposure time is performed by a mechanical shutter part.

Moreover, although an example is shown in FIG. 1, where the exposure control is performed using an image at a time of the live-view mode of the image sensor 4, when another sensor for exposure is provided like a single-lens reflex system, the aperture value and the exposure time may be determined by determining a proper exposure amount using the sensor for exposure.

On the image memory 11, an interlaced image is recorded during the live-view mode operation, and as mentioned above, the interlaced image is used for display on the image displaying part 5 and determination of the aperture value and the exposure time. Then, once the still-image photographing mode is executed, data of all pixels is recorded on the image memory 11.

Next, details of the image processing part 10 will be described. After being passed through an unillustrated A/D converting part etc., an image signal output from the image sensor 4 is input into the image processing part 10. As illustrated in FIG. 1, the image processing part 10 includes a first gradation converting part 13 and a second gradation converting part 14. Other than these, the image processing part 10 includes unillustrated parts, such as, a white-balance adjusting part, a color correction part, and a contour enhancement processing part. Since, details of these parts are the same as that of a known technology, description thereof will be omitted.

The first gradation converting part 13 performs gradation conversion using a gamma curve on an input image. When the input image is an image of three colors of RGB, gamma transformation that is expressed by $y=f(x)$, is performed with respect to the three components. That is, images of R', G' and B' after being subjected to gamma transformation are expressed by the following formulas, respectively.

$$R'=f(R) \quad \text{(formula 1)}$$

$$G'=f(G) \quad \text{(formula 2)}$$

$$B'=f(B) \quad \text{(formula 3)}$$

In accordance with the gradation conversion by the first gradation converting part 13, the contrast and the brightness of the whole image can be changed. On the other hand, however, when a person is caused to be bright, for example in a picture composition of a backlit person, the background will also be bright, thereby, the contrast will also decrease. Therefore, in order to cause the dark face of the backlit person to be bright while suppressing the change of the backlit background, uniform processing of the whole image alone is not sufficient, rather conversion depending on a local characteristic in each place of an image is necessary.

The second gradation converting part 14 performs gradation conversion on the input image, depending on such a local characteristic. In Japanese Unexamined Patent Application Publication No. 2006-114005, the applicant of the present embodiments has proposed a gradation converting apparatus (method) which performs gradation conversion depending on a local characteristic in each place of an image. The feature is in that the way of setting partial gradation of an image can be adjusted moderately. In other words, while balance of brightness and darkness of the whole image is adjusted from a broad perspective by the above-mentioned first gradation converting part 13 using an arbitrary gradation conversion characteristic, the way of setting detailed gradation can be adjusted further by the second gradation converting part 14.

The input image is denoted as an image of three colors of R, G and B, or an image having brightness of Y, and color differences of Cr and Cb, which is converted from the RGB image by the following formulas.

$$Y=c1 \cdot R + c2 \cdot G + c3 \cdot B \quad \text{(formula 4)}$$

$$Cr=R-Y \quad \text{(formula 5)}$$

$$Cb=B-Y \quad \text{(formula 6)}$$

In formula 4, c1 to c3 are coefficients. Next, a value with regard to a pixel is calculated by the following formula.

$$V[i,j]=Y[i,j]+b2 \cdot |Cr[i,j]|+b3 \cdot |Cb[i,j]| \quad \text{(formula 7)}$$

In formula 7, [i, j] represents a position of a pixel, and b2 and b3 are coefficients. Moreover, although formula 7 represents a simplest case, instead of this, the following formula may be used.

$$V[i,j]=Y[i,j]+b2 \cdot Cr[i,j]+b3 \cdot Cb[i,j] \quad \text{(formula 8)}$$

In formula 8, coefficients b2 and b3 may be determined depending on Cr[i, j] and Cb[i, j], respectively.

Next, by subjecting V[i, j] to low pass processing, a blurred image VL[i, j] of V is generated. Then, using the above-mentioned respective formulas, value x with regard to each pixel is calculated by the following formula.

$$x[i,j]=a1 \cdot Y[i,j]+a2 \cdot |Cr[i,j]|+a3 \cdot |Cb[i,j]|+a4 \cdot VL[i,j] \quad \text{(formula 9)}$$

In formula 9, a1 to a4 are coefficients. Moreover, in formula 9, by replacing the part of a2·|Cr[i, j]|+a3·|Cb[i, j]| with a2·Cr[i, j]+a3·Cb[i, j], the coefficients a2 and a3 may be determined depending on Cr[i, j] and Cb[i, j], respectively. Moreover, in formula 9, a4 is not zero, and at least one of a2, a3, b2, and b3 is not zero.

By being subjected to low pass processing as mentioned above, value V[i, j] of a target pixel at position [i, j] is replaced by value VL[i, j] affected by the positional value of the neighboring region of the target pixel, thereby, the effect of the neighboring region of the target pixel is reflected on processing.

The second gradation converting part 14 has an LUT which provides a gain k(x) to pixel value x of an input image, and by performing multiplication of the gain k(x) through the following formula using the LUT, performs gradation conversion. When the input image is an image of three colors of RGB, an R' G' B' image after being subjected to gradation conversion is expressed by the following formulas.

$$R'=R \cdot k(x) \quad \text{(formula 10)}$$

$$G'=G \cdot k(x) \quad \text{(formula 11)}$$

$$B'=B \cdot k(x) \quad \text{(formula 12)}$$

Moreover, when the input image is an image of YCrCb, a Y'Cr'Cb' image after being subjected to gradation conversion is expressed by the following formula.

$$Y'=Y \cdot k(x) \quad \text{(formula 13)}$$

$$Cr'=Cr \cdot k(x) \quad \text{(formula 14)}$$

$$Cb'=Cb \cdot k(x) \quad \text{(formula 15)}$$

Finally, the second gradation converting part 14 performs conversion from Y'Cr'Cb' to R'G'B', only when it is required according to the flow of subsequent processing.

In addition, by changing the gain to be multiplied on color differences Cr and Cb by the gain to be multiplied on brightness Y, formulas 14 and 15 may be changed by the following formulas, respectively.

$$Cr'=Cr \cdot k2(x) \quad \text{(formula 16)}$$

$$Cb'=Cb \cdot k3(x) \quad \text{(formula 17)}$$

Figure 2:
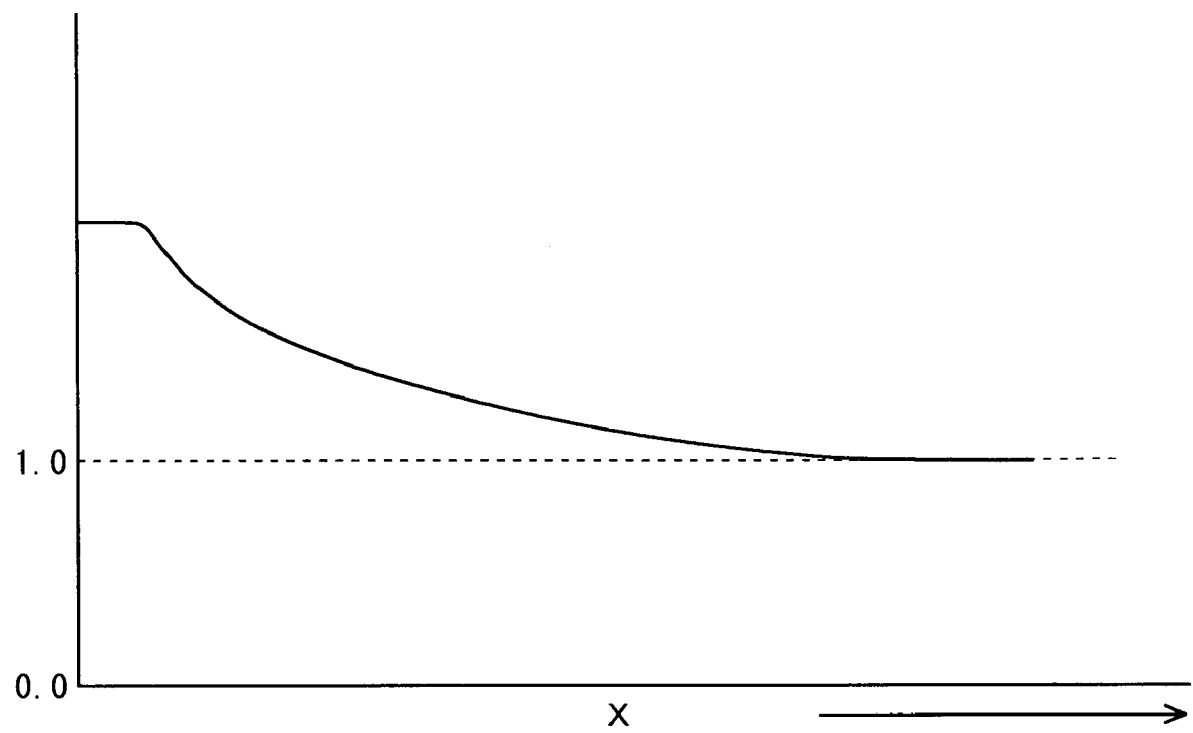
FIG. 2 is a view illustrating characteristics of gains k(x), k2(x) and k3(x).

In addition, in formulas 13 to 17, gains k(x), k2(x), and k3(x) (where, k2(x)≈k3(x)) which are provided as an LUT have a characteristic illustrated, for example, in FIG. 2. The characteristic is determined experimentally by trial and error.

In the above-described gradation conversion in the second gradation converting part 14, in order to change processing, there are the following three methods.

(1) Processing is changed by preparing a plurality of gains (for example, k=k1a(x) and k=k1b(x)) with regard to gain k(x) which controls brightness and a gain and using these gains properly. In addition, the method also includes a case where an effect equivalent to that of a case where a plurality of gains is properly and equivalently used is obtained by way of weighted composition of images before and after being multiplied by gain (x).

(2) Processing is changed by changing the ratio between values of coefficient a4 and coefficient a1 which control the strength of local contrast, in formula 9 mentioned above. For example, provided that a4=α and a1=(1−α), formula 9 is expressed by the following formula.

$$x[i,j]=\alpha \cdot Y[i,j]+a2 \cdot |Cr[i,j]|+a3 \cdot |Cb[i,j]|+(1-\alpha) \cdot VL[i,j] \quad \text{(formula 18)}$$

Additionally, contribution of the local characteristic in gradation conversion can be changed by changing the value of α in formula 18. Note that, in order to change contribution of the local characteristic in gradation conversion, the content of low pass processing at the above-mentioned operation of generating blurred image VL[i,j] of V may be changed.

(3) As described in formulas 16 and 17 mentioned above, vividness of a color can be controlled, if processing is changed by changing gains k2(x) and k3(x) to be multiplied to color differences Cr and Cb into gain k(x) to be multiplied to brightness Y. Further, color saturation can be changed by preparing a plurality of gains to be multiplied to color differences Cr and Cb and using these gains properly.

In accordance with gradation conversion by the second gradation converting part 14, conversion related to VL (the amount of neighborhood average of pixel[i, j] of V) based on pixel values of the predetermined range from each pixel of the image, that is conversion depending on a local characteristic in each place of an image, can be attained. Moreover, controlling the degree of dependence of the image on the local characteristic by changing the value of α, which is a parameter, enables the image quality to be controlled. For example, in a picture composition of a backlit person, such processing in which only the portion of the person who came out dark due to backlight can be made lighter without largely changing lightly depicted background, can be attained. Moreover, by adjusting the value of α, which is a parameter, it will be possible to adjust preference of the image quality. Further, by changing the magnitude of gain k(x), it will be possible to adjust the degree of gradation compression in gradation conversion and the brightness of an image after being subjected to gradation conversion.

In relation to the above-described image processing part 10, the electronic camera 1 includes a plurality of gradation compression modes. The gradation compression modes can be set to be ON and OFF, and when a gradation compression mode is set to be ON, three stages of "weak", "medium", and "strong" can be selected. The selection of these modes is performed by user's operation through an unillustrated operating part. In addition, an operating member specific for selection of the gradation compression mode may be provided, or a configuration in which selection of the gradation compression mode is performed by combination of a menu displayed on the image displaying part 5 and an existing operating member, may be used.

Figure 3:
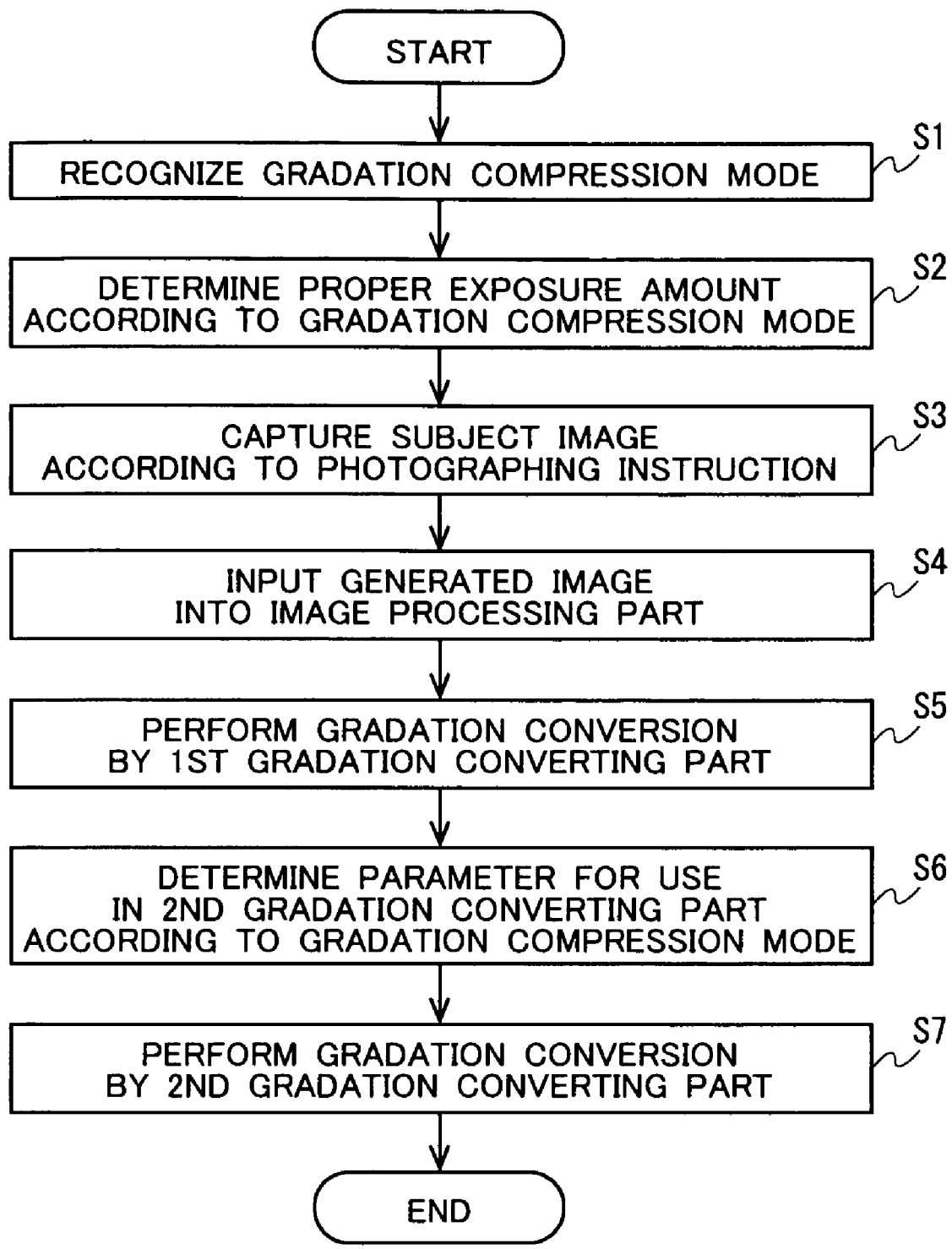
FIG. 3 is a flow chart illustrating an operation of a camera controlling part 12 in accordance with the first embodiment.

Operation of the camera controlling part 12 when the gradation compression mode is set to be ON, will be described using the flowchart in FIG. 3. In the first embodiment, as shown in the following Table 1, a proper exposure amount, a gamma curve for use in the first gradation converting part 13, and parameters for use in the second gradation converting part 14, are determined.

mode recognized at Operation S1. As shown in Table 1, the proper exposure amount tends to be under-exposure as the gradation compression mode becomes "weak"→"medium"→"strong". The exposure controlling part 9 determines an aperture value and an exposure time according to the determined proper exposure amount, and supplies the aperture value and the exposure time to the aperture diaphragm controlling part 6 and the image sensor drive controlling part 7, respectively.

At Operation S3, by controlling the aperture diaphragm controlling part 6 and the image sensor drive controlling part 7 according to a photographing instruction of the user through an unillustrated operating part, the camera controlling part 12 picks up the subject image. At that time, the aperture diaphragm controlling part 6 and the image sensor drive controlling part 7 perform controlling according to the aperture value and the exposure time which are supplied from the exposure controlling part 9.

At Operation S4, the camera controlling part 12 inputs an image generated by way of image-picking up at Operation S3 into the image processing part 10 as a first image.

At Operation S5, by controlling the first gradation converting part 13, the camera controlling part 12 performs gradation conversion on each element of the first image and generates a second image. The first gradation converting part 13 performs gradation conversion with respect to the first image using a first gamma curve. The first gamma curve is a gamma curve determined by the camera controlling part 12 similarly to a known technology, and is a gamma curve regardless of the gradation compression mode recognized at Operation S1. In addition, when the first image is a YCrCb image, the camera controlling part 12 changes the image into an RGB image appropriately, and then performs gradation conversion.

At Operation S6, the camera controlling part 12 determines parameters for use in the second gradation converting part 14, according to the gradation compression mode recognized at Operation S1. As shown in Table 1, when the gradation compression mode is "weak", the camera controlling part 12 selects a first parameter group and determines it as the parameter for use in the second gradation converting part 14, when the gradation compression mode is "medium", the camera controlling part 12 selects a second parameter group and determines it as the parameter for use in the second gradation converting part 14, and when the gradation compression mode is "strong", the camera controlling part 12 selects a third parameter group and determines it as the parameter for

TABLE 1

| gradation compression mode | exposure | first gradation converting part | second gradation converting part |
| --- | --- | --- | --- |
| weak | output value of a usual multi-photometry | first gamma curve | first parameter group |
| medium | output value of exposure that is under-exposure by ΔEV1 than the output value of the usual multi-photometry | first gamma curve | second parameter group |
| strong | output value of exposure that is under-exposure by ΔEV2 than the output value of the usual multi-photometry | first gamma curve | third parameter group |

At Operation S1, the camera controlling part 12 recognizes the selected gradation compression mode.

At Operation S2, by controlling the exposure controlling part 9, the camera controlling part 12 determines a proper exposure amount according to the gradation compression use in the second gradation converting part 14. The first to third parameter groups are parameter groups each having different contents. Then the camera controlling part 12 supplies the determined parameters to the second gradation converting part 14.

At Operation S7, by controlling the second gradation converting part 14, the camera controlling part 12 performs gradation conversion on each element of the second image and generates a third image. At that time, the second gradation converting part 14 performs gradation conversion using the parameters supplied from the camera controlling part 12 at Operation S6.

As described above, in accordance with the first embodiment, the parameters for use in the second gradation converting part which performs gradation conversion on an original image based on pixel values within a predetermined range from each pixel of the original image, and the parameter (gamma curve) for use in the first gradation converting part which performs gradation conversion on the original image depending on each pixel value of the original image, are determined. Therefore, it is possible to correct dark area gradation of an image while maintaining brightness of the whole image by the second gradation converting part, and to determine parameters for realizing preferable gradation conversion suitably. Moreover, by performing gradation conversion using the determined parameters, it is possible to correct dark area gradation of an image while maintaining brightness of the whole image by the second gradation converting part, and to realize preferable gradation conversion.

In accordance with gradation conversion by the second gradation converting part, characteristic processing such as expressing a backlight person lightly is possible, thereby the processing can also be considered as a function for compressing a dynamic range. Moreover, by appropriately changing the contents of gradation conversion by the second gradation converting part, it is possible to produce a picture and to express an image corresponding to a wide variety of preference of the image quality for every individual, and the like. As mentioned above, by determining the parameters for use in the second gradation converting part and the parameters for use in the first gradation converting part according to the gradation compression mode, it is possible to sufficiently utilize the characteristic of gradation conversion by the second gradation converting part.

Moreover, gradation conversion by the second gradation converting part is affected largely by the characteristic of gradation conversion by the first gradation converting part which is executed in combination with that of the second gradation converting part. Therefore, controlling gradation conversion by the first gradation converting part and gradation conversion by the second gradation converting part, while associating them, enables processing to be performed in an optimum combination, thus enabling the image quality to be controlled.

Moreover, in accordance with the first embodiment, when the gradation compression mode is "strong", exposure is set to be under-exposure as compared to the case where the gradation compression mode is "weak". Therefore, in such a shooting situation where the white washout may partially occur in usual shooting, the white washout due to saturation can be prevented, and image processing for a relatively darkly photographed part where brightness of the part is maintained without decreasing contrast, can be performed by the second gradation converting part.

In addition, in the first embodiment, the second gradation converting part 14 may use the same parameter in a case where the gradation compression mode is "weak" and in a case where the gradation compression mode is "medium". Similarly, the second gradation converting part 14 may use the same parameters in a case where the gradation compression mode is "medium" and in a case where the gradation compression mode is "strong".

(Second Embodiment)

Hereinafter, a second embodiment will be described using drawings. In the second embodiment, only parts different from those of the first embodiment will be described. The electronic camera of the second embodiment has the same configuration as that of the electronic camera 1 described in the first embodiment. Description will be given below, using the same reference numerals as those of the first embodiment.

Figure 4:
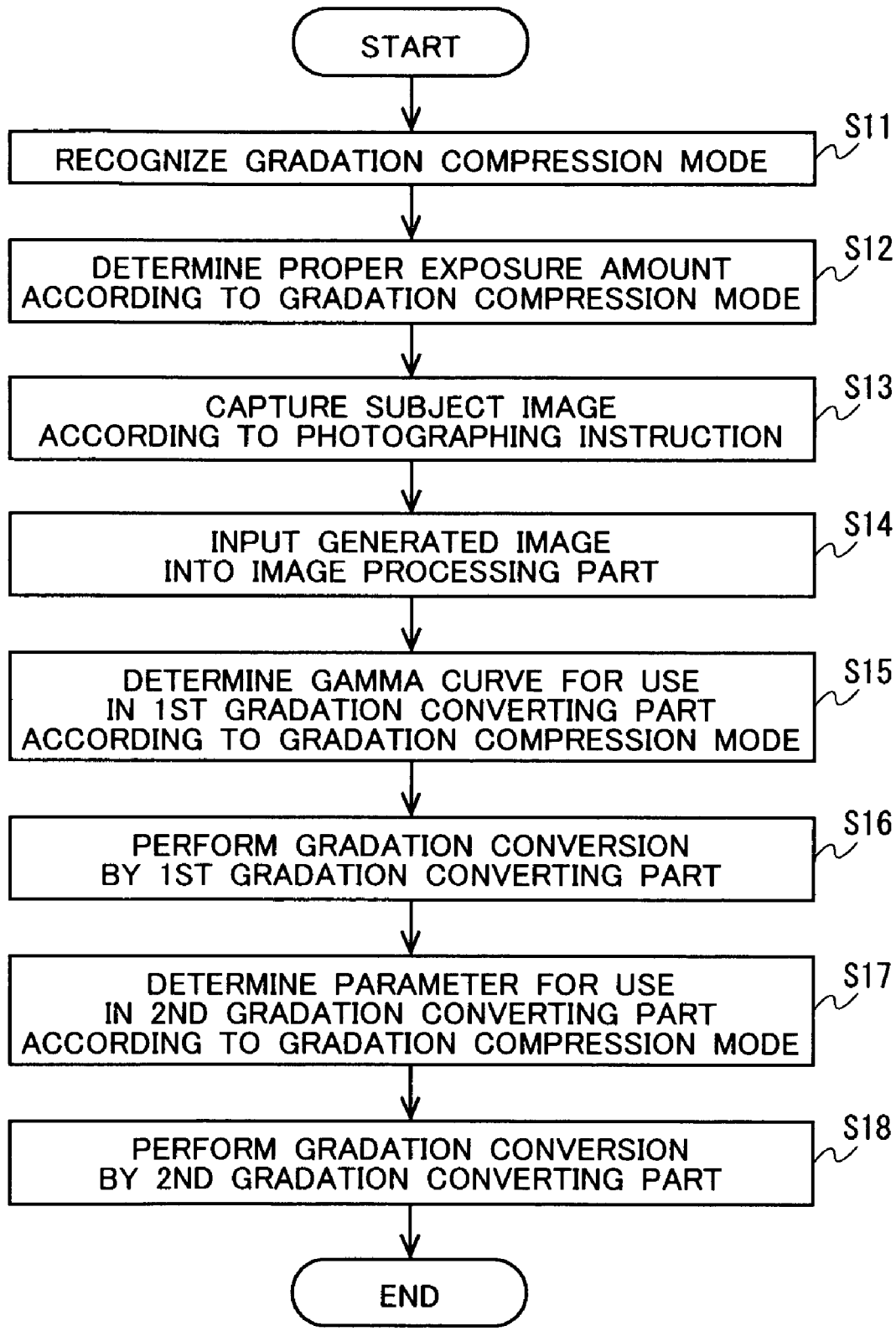
FIG. 4 is a flow chart illustrating an operation of a camera controlling part 12 in accordance with a second embodiment.

In the second embodiment, operation of a camera controlling part 12 when the gradation compression mode is set to be ON, will be described using the flowchart in FIG. 4. In the second embodiment, as shown in the following Table 2, a proper exposure amount, gamma curves for use in a first gradation converting part 13, and parameters for use in a second gradation converting part 14, are determined.

TABLE 2

| gradation compression mode | exposure | first gradation converting part | second gradation converting part |
|---|---|---|---|
| weak | output value of a usual multi-photometry | first gamma curve | first parameter group |
| medium | output value of exposure that is under-exposure by ΔEV1 than the output value of the usual multi-photometry | second gamma curve | second parameter group |
| strong | output value of exposure that is under-exposure by ΔEV2 than the output value of the usual multi-photometry | third gamma curve | third parameter group |

At Operation S11, the camera controlling part 12 recognizes the selected gradation compression mode.

At Operation S12, the camera controlling part 12, by controlling an exposure controlling part 9, determines a proper exposure amount according to the gradation compression mode recognized at Operation S1. Determination of the proper exposure amount is performed similarly to the first embodiment (similarly to Operation S2 in FIG. 3). The exposure controlling part 9 determines an aperture value and an exposure time according to the determined proper exposure amount, and supplies the aperture value and the exposure time to an aperture diaphragm controlling part 6 and an image sensor drive controlling part 7, respectively.

At Operation S13, by controlling the aperture diaphragm controlling part 6 and the image sensor drive controlling part 7 according to a photographing instruction of the user through an unillustrated operating part, the camera controlling part 12 picks up the subject image. At that time, the aperture diaphragm controlling part 6 and the image sensor drive controlling part 7 perform controlling according to the aperture value and the exposure time which are supplied from the exposure controlling part 9, respectively.

At Operation S14, the camera controlling part 12 inputs an image generated by way of image-picking up at Operation S13 into an image processing part 10 as a first image.

At Operation S15, the camera controlling part 12 determines a gamma curve for use in the first gradation converting part 13, according to the gradation compression mode recognized at Operation S11. As shown in Table 2, when the gradation compression mode is "weak", the camera controlling part 12 selects a first gamma curve and determines it as the gamma curve for use in the first gradation converting part 13, when the gradation compression mode is "medium", the camera controlling part 12 selects a second gamma curve and determines it as the gamma curve for use in the first gradation converting part 13, and when the gradation compression mode is "strong", the camera controlling part 12 selects a third gamma curve and determines it as the gamma curve for use in the first gradation converting part 13. The first to third gamma curves are gamma curves each having a different characteristic. Then the camera controlling part 12 supplies the determined gamma curve to the first gradation converting part 13.

At Operation S16, by controlling the first gradation converting part 13, the camera controlling part 12 performs gradation conversion on each element of the first image and generates a second image. At that time, the first gradation converting part 13 performs gradation conversion using the gamma curves supplied from the camera controlling part 12 at Operation S15. In addition, when the first image is a YCrCb image, the camera controlling part 12 changes the image into an RGB image appropriately, and then performs gradation conversion.

At Operation S17, the camera controlling part 12 determines parameters for use in the second gradation converting part 14 according to the gradation compression mode recognized at Operation S11. Determination of the parameters for use in the second gradation converting part 14 is performed similarly to the first embodiment (similarly to Operation S6 in FIG. 3). Then the camera controlling part 12 supplies the determined parameters to the second gradation converting part 14.

At Operation S18, by controlling the second gradation converting part 14, the camera controlling part 12 performs gradation conversion in each element of the second image and generates a third image. At that time, the second gradation converting part 14 performs gradation conversion using the parameters supplied from the camera controlling part 12 at Operation S17.

As described above, in accordance with the second embodiment, the parameters for use in the second gradation converting part and the parameter (gamma curve) and the exposure amount for use in the first gradation converting part are determined. Gradation conversion by the second gradation converting part is also affected largely by the exposure condition at the time of image-picking up. Therefore, controlling gradation conversion by the first gradation converting part and gradation conversion by the second gradation converting part, while associating them to the exposure condition, enables processing to be performed in an optimum combination, thus enabling the image quality to be controlled.

In addition, in the second embodiment, a the first gradation converting part 13 may use the same gamma curve in a case where the gradation compression mode is "weak" and in a case where the gradation compression mode is "medium". Similarly, the first gradation converting part 13 may use the same gamma curve in a case where the gradation compression mode is "medium" and in a case where the gradation compression mode is "strong".

Moreover, in the second embodiment, the second gradation converting part 14 may use the same parameters in a case where the gradation compression mode is "weak" and in a case where the gradation compression mode is "medium". Similarly, the second gradation converting part 14 may use the same parameters in a case where the gradation compression mode is "medium" and in a case where the gradation compression mode is "strong".

In addition, in the first and the second embodiments, examples are described, in which a gamma curve for use in the first gradation converting part 13 is determined to perform gradation conversion by the first gradation converting part 13, and parameters for use in the second gradation converting part 14 is determined to perform gradation conversion by the second gradation converting part 14. However, a configuration may be used in which the determined gamma curve and parameters are recorded by associating them with the input image. Further a configuration may be used in which practical gradation conversion (corresponding to gradation conversion by the first gradation converting part 13 and the second gradation converting part 14) is performed in the electronic camera 1 or in an external device such as a computer.

Moreover, in the first and the second embodiments, examples are described, in which technologies are realized in the electronic camera 1. However, the present embodiments are not limited to them. For example, the present embodiments can also be applied to devices such as a compact type electronic camera and a movie camera shooting a moving image, similarly.

(Third Embodiment)

Hereinafter, a third embodiment will be described using drawings. In the third embodiment, description will be given using an image processing apparatus constituted of a computer.

Figure 5:
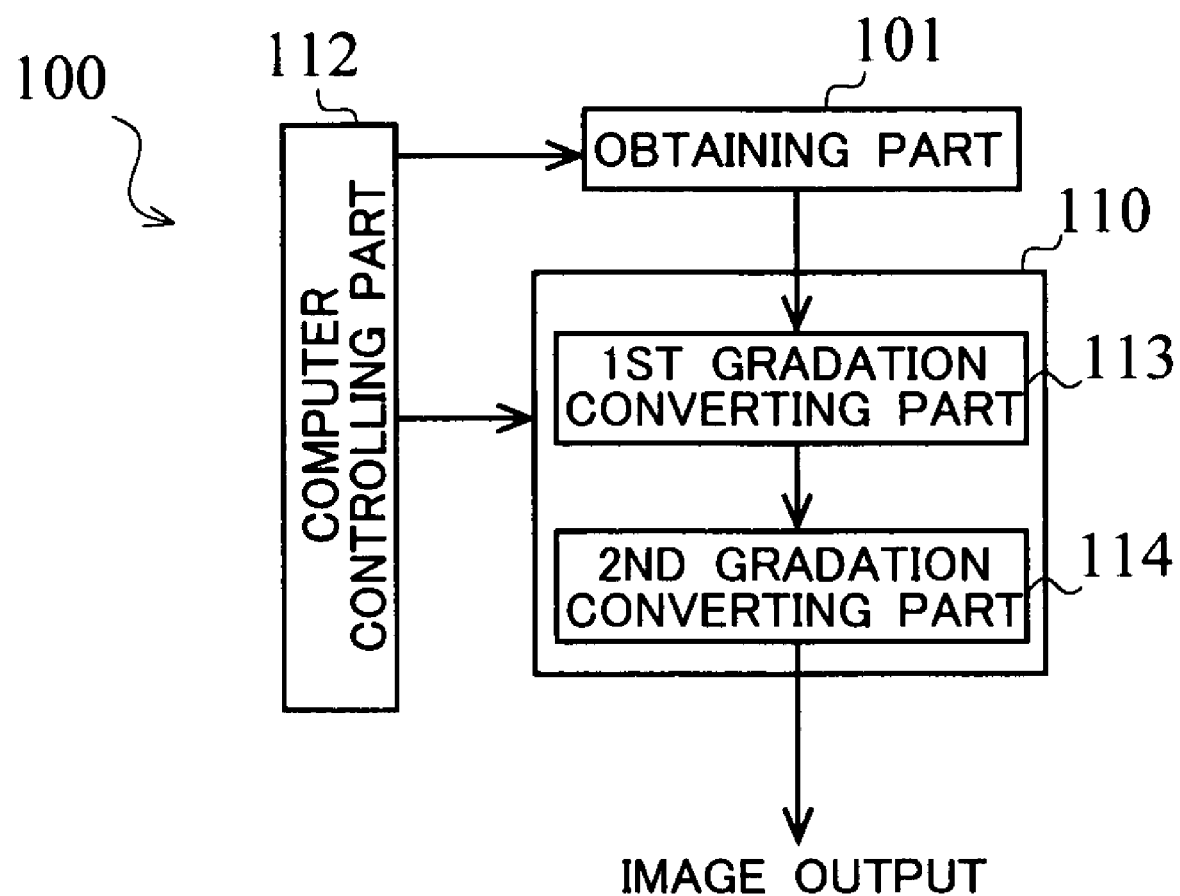
FIG. 5 is a view illustrating a configuration of a computer 100 in accordance with a third embodiment.

FIG. 5 is a view illustrating the configuration of a computer 100 of the present embodiment. As illustrated in FIG. 5, the computer 100 includes an obtaining part 101, an image processing part 110, and a computer controlling part 112. The computer 100 also includes other parts, such as a memory which saves image data obtained by the obtaining part 101 temporarily; a recording part; an operating part which includes a power button, a mouse, a keyboard, and the like; and an image displaying part.

The obtaining part 101 obtains an image from an external device, such as an electronic camera or a recording medium, through a wired line, a wireless line, a drive for recording media, or the like. Moreover, the computer controlling part 112 controls each part totally and records a program for executing each processing in advance. Moreover, the image processing part 110 includes a first gradation converting part 113 and a second gradation converting part 114. The details of the first gradation converting part 113 and the second gradation converting part 114 are the same as those of the first gradation converting part 13 and the second gradation converting part 14 described in the first and the second embodiments. In the present embodiment, the second gradation converting part 114 performs gradation conversion on an image after being subjected to gradation conversion by the first gradation converting part 113.

In addition, in the present embodiment, an image to be a target of gradation conversion has information indicating the kind of the gradation compression mode (three stages of "weak", "medium", and "strong") described in the first and second embodiments as the incidental information thereof.

Moreover, in the present embodiment, the image to be a target of gradation conversion may be any image such as a YCbCr image, other than an RGB image, as long as it can be converted into the RGB image. Moreover, the RGB image may be a linear RGB image which has three planes of R, G and B, or may be an RGB image which is subjected to certain processing.

Figure 6:
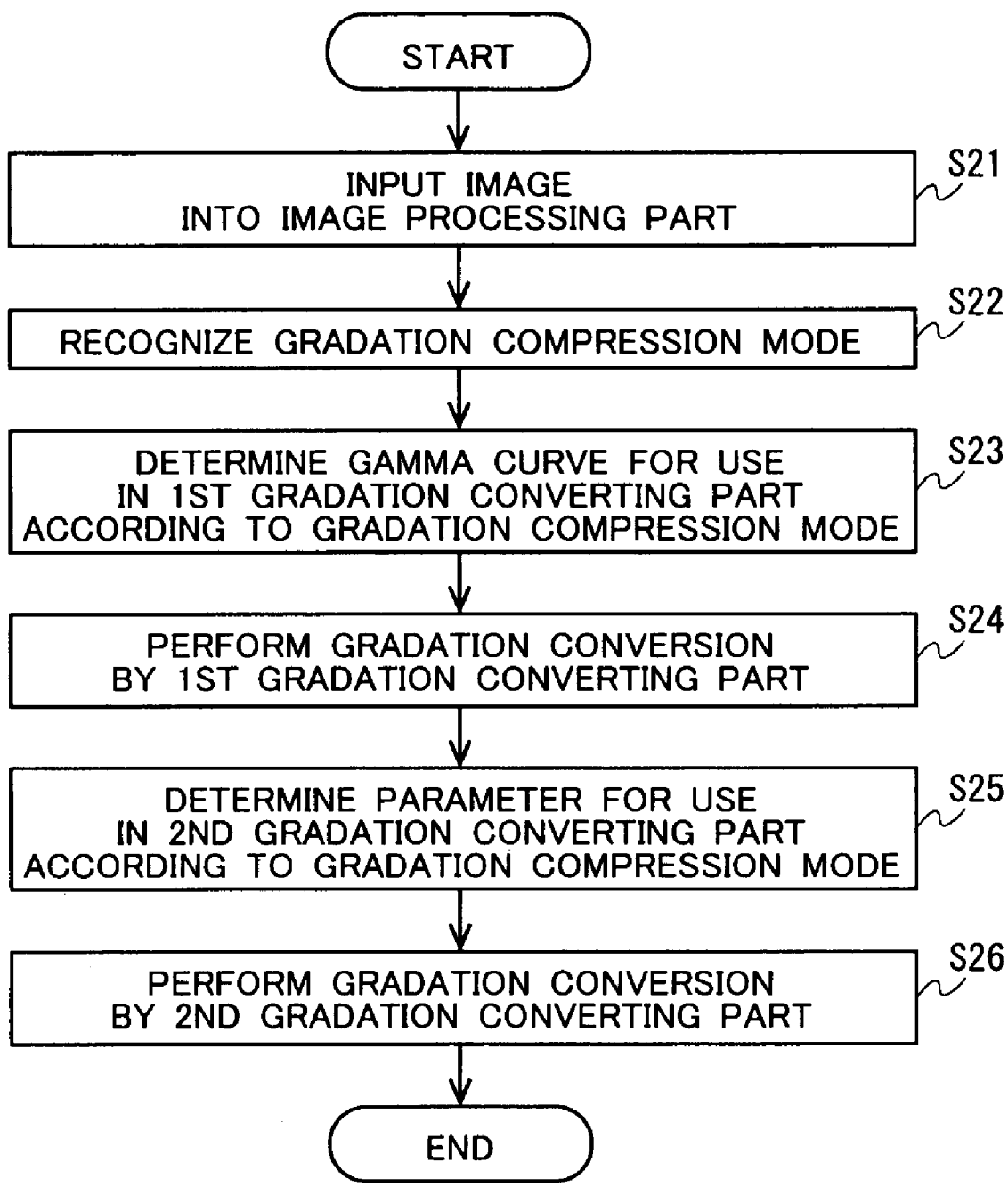
FIG. 6 is a flow chart illustrating an operation of a computer controlling part 112 in accordance with the third embodiment.

Hereinafter, operation of the computer controlling part 112 when gradation conversion is performed on the image which has information indicating the kinds of the gradation compression mode, will be described using the flowchart in FIG. 6. In the third embodiment, as shown in the following Table 3, a gamma curve for use in the first gradation converting part 113, and parameters for use in the second gradation converting part 114 are determined.

TABLE 3

| gradation compression mode | first gradation converting part | second gradation converting part | | |
|---|---|---|---|---|
| | | | α | k(x) | k2(x) |
| none | normal gamma curve | — | — | — | — |
| weak | first gamma curve f1 | first parameter group | $\alpha_a$ | $k_a$ | $k2_a$ |
| medium | second gamma curve f2 | second parameter group | $\alpha_b$ | $k_b$ | $k2_b$ |
| strong | third gamma curve f3 | third parameter group | $\alpha_c$ | $k_c$ | $k2_c$ |

At Operation S21, the computer controlling part 112 obtains a target image to be processed from the obtaining part 101, an unillustrated recording part or an image memory, and inputs the image into the image processing part 110 as a first image.

At Operation S22, the computer controlling part 112 recognizes gradation compression mode, based on the incidental information of the image obtained at Operation S21.

At Operation S23, the computer controlling part 112 determines a gamma curve for use in the first gradation converting part 113, according to the gradation compression mode recognized at Operation S22. Determination of the gamma curve for use in the first gradation converting part 113 is performed similarly to the second embodiment (similarly to Operation S15 in FIG. 4). Then the computer controlling part 112 supplies the determined gamma curve to the first gradation converting part 113.

At Operation S24, by controlling the first gradation converting part 113, the computer controlling part 112 performs gradation conversion on each element of the first image to generate a second image. At that time, the first gradation converting part 113 performs gradation conversion using the gamma curve supplied from the computer controlling part 112 at Operation S23. In addition, when the first image is a YCrCb image, the computer controlling part 112 changes the image into an RGB image appropriately, and then performs gradation conversion.

At Operation S25, the computer controlling part 112 determines parameters for use in the second gradation converting part 114, according to the gradation compression mode recognized at Operation S22. Determination of the parameters for use in the second gradation converting part 114 is performed similarly to the first embodiment (similarly to Operation S6 in FIG. 3). In addition, in Table 3, among parameter groups for use in the second gradation converting part 114, α is a parameter for changing the contribution of local characteristic in the gradation conversion and it is corresponding to α in formula 18 of the first embodiment. Moreover, k(x) and k2(x) are gains provided in LUT, and they are corresponding to k(x) and k2(x) (and k3(x)≈k2(x)) in formulas 10 to 17 of the first embodiment. As shown in Table 3, when the gradation compression mode is "weak", the computer controlling part 112 selects $\alpha_a$, $k_a$ and $k2_a$ and determines them as the parameters for use in the second gradation converting part 114, when the gradation compression mode is "medium", the computer controlling part 112 selects $\alpha_b$, $k_b$ and $k2_b$ and determines them as the parameters for use in the second gradation converting part 114, and when the gradation compression mode is "strong", the computer controlling part 112 selects $\alpha_c$, $k_c$ and $k2_c$ and determines them as the parameters for use in the second gradation converting part 114. By selecting α from $\alpha_a$, $\alpha_b$, and $\alpha_c$, the contribution of influence to each point of the image by the neighboring region of each point can be changed. Moreover, by selecting k2 from $k2_a$, $k2_b$, and $k2_c$, the amplitude of color saturation can be changed. In addition, by changing a low-pass filter used at the time of generating blurred image VL[i, j] of V, an effect equivalent to that when α is changed, can be obtained.

Then, the computer controlling part 112 supplies the determined parameters to the second gradation converting part 114.

At Operation S26, by controlling the second gradation converting part 114, the computer controlling part 112 performs gradation conversion on each element of the second image and generates a third image. At that time, the second gradation converting part 114 performs gradation conversion using the parameters supplied from the computer controlling part 112 at Operation S25.

In addition, when being subjected to gradation conversion by the second gradation converting part 114, the third image is usually an RGB image. However, according to the characteristic of the gamma curve determined at Operation S23, the third image may be subjected to gradation conversion by the second gradation converting part 114 after being changed into a YCbCr image from the RGB image. For example, when gamma change in the gamma curve determined at operation S23 is larger than a predetermined standard, by changing the third image into a YCrCb image, then subjecting it to gradation conversion by the second gradation converting part 114, more preferable gradation conversion can be realized regarding to color adjustment, etc.

As described above, in accordance with the third embodiment, the second image is generated by way of gradation conversion by the first gradation converting part, and the second image or a linearly-transformed image of the second image is subjected to gradation conversion by the second gradation converting part. Therefore, it is possible to perform gradation conversion by the second gradation converting part, selectively. In other words, it is possible to select whether gradation conversion by the second gradation converting part is always performed or not, and, in each case, it is possible to select whether gradation conversion by the second gradation converting part is performed or not. Moreover, it is also possible that after gradation conversion by the first gradation converting part is performed, gradation conversion by the second gradation converting part is performed at user's desired timing.

(Fourth Embodiment)

Hereinafter, a fourth embodiment will be described using drawings. In the fourth embodiment, only portions different from the third embodiment will be described.

Figure 7:
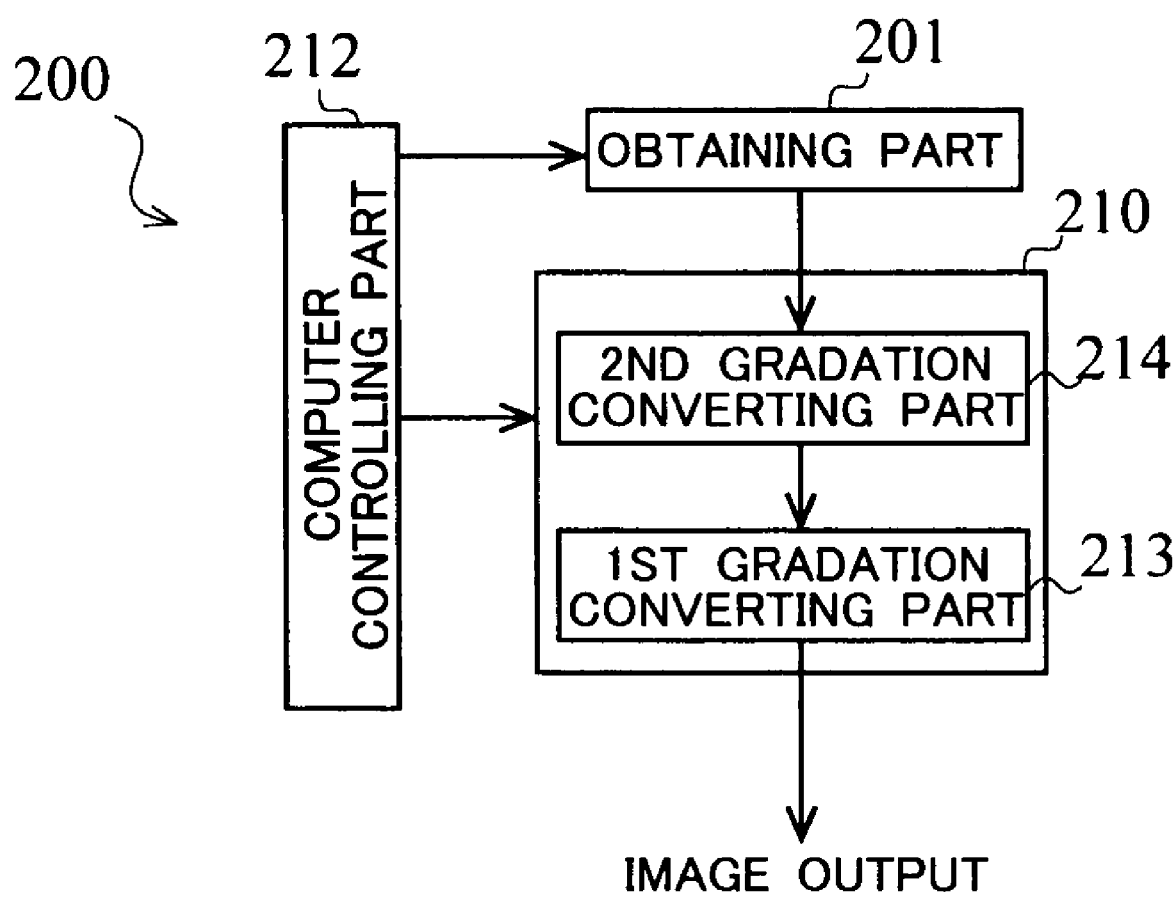
FIG. 7 is a view illustrating a configuration of a computer 200 in accordance with a fourth embodiment.

FIG. 7 is a view illustrating the configuration of a computer 200 of the present embodiment. Although the computer 200 of the present embodiment has almost the same configuration as that of the computer 100 of the third embodiment, only the order of processing of a first gradation converting part 213 and a second gradation converting part 214 in an image processing part 210 differs from that of the third embodiment. The details of the first gradation converting part 213 and the second gradation converting part 214 are the same as those of the first gradation converting part 113 and the second gradation converting part 114 described in the third embodiment. In the present embodiment, the first gradation converting part 213 performs gradation conversion on the image after being subjected to gradation conversion by the second gradation converting part 214.

In addition, in the present embodiment, similar to the third embodiment, an image to be a target of gradation conversion has information indicating the kind of the gradation compression mode (three stages of "weak", "medium", and "strong") described in the first and second embodiments as the incidental information thereof. Moreover, in the present embodiment, similar to the third embodiment, the image to be a target of gradation conversion may be any image such as a YCbCr image, other than an RGB image, as long as it can be converted into the RGB image. Moreover, the RGB image may be a linear RGB image which has three planes of R, G and B, or may be an RGB image which is subjected to certain processing.

Figure 8:
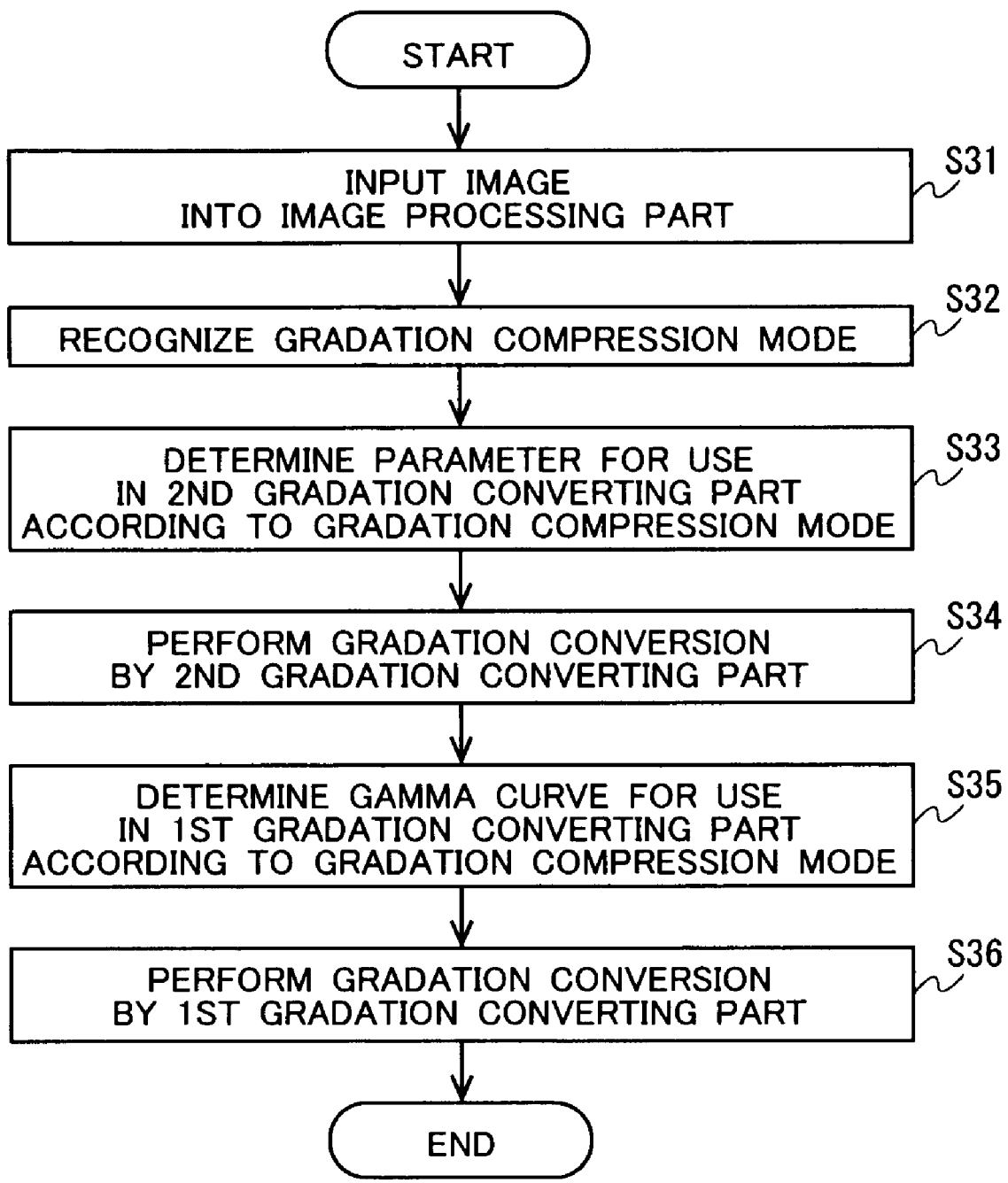
FIG. 8 is a flow chart illustrating an operation of a computer controlling part 212 in accordance with the fourth embodiment.

Hereinafter, operation of the computer controlling part 212 when performing gradation conversion on an image which has information indicating the kinds of the gradation compression mode, will be described using the flowchart in FIG. 8. In the fourth embodiment, as shown in the following Table 4, a gamma curve for use in the first gradation converting part 213 and parameters for use in the second gradation converting part 214, are determined.

TABLE 4

| gradation compression mode | second gradation converting part | | | first gradation converting part |
|---|---|---|---|---|
| | α | k(x) | k2(x) | |
| none | — | — | — | normal gamma curve |
| weak | first parameter group | $\alpha_a$ | $k_a$ | $k2_a$ | first gamma curve f1 |
| medium | second parameter group | $\alpha_b$ | $k_b$ | $k2_b$ | second gamma curve f2 |
| strong | third parameter group | $\alpha_c$ | $k_c$ | $k2_c$ | third gamma curve f3 |

At Operation S31, the computer controlling part 212 obtains a target image to be processed from an obtaining part 201, an unillustrated recording part or an image memory, and inputs the image into the image processing part 210 as a first image.

At Operation S32, the computer controlling part 212 recognizes gradation compression mode, based on the incidental information of the image obtained at Operation S31.

At Operation S33, the computer controlling part 212 determines parameters for use in the second gradation converting part 214 according to the gradation compression mode recognized at Operation S32. Determination of the parameters for use in the second gradation converting part 214 is performed similarly to the third embodiment (similarly to Operation S25 in FIG. 6). Then the computer controlling part 212 supplies the determined parameters to the second gradation converting part 214.

At Operation S34, by controlling the second gradation converting part 214, the computer controlling part 212 performs gradation conversion on each element of the first image and generates a second image. At that time, the second gradation converting part 214 performs gradation conversion using the parameters supplied from the computer controlling part 212 at Operation S33.

At Operation S35, the computer controlling part 212 determines a gamma curve for use in the first gradation converting part 213 according to the gradation compression mode recognized at Operation S32. Determination of the gamma curve for use in the first gradation converting part 213 is performed similarly to the third embodiment (similarly to Operation S23 in FIG. 6). Then, the computer controlling part 212 supplies the determined gamma curve to the first gradation converting part 213.

At Operation S36, by controlling the first gradation converting part 213, the computer controlling part 212 performs gradation conversion on each element of the second image and generates a third image. At that time, the first gradation converting part 213 performs gradation conversion using the gamma curve supplied from the computer controlling part 212 at Operation S35. In addition, when the second image is a YCrCb image, the computer controlling part 212 changes the image into an RGB image appropriately, and then performs gradation conversion.

As described above, in accordance with the fourth embodiment, the second image is generated by way of gradation conversion by the second gradation converting part, and the third image is generated by subjecting the second image or an image that is made up of a plurality color components based on the second image to gradation conversion by the first gradation converting part. Therefore, there are more merits in optimizing an image including "spread" of colors.

In addition, in the third and fourth embodiments, image processing corresponding to the exposure control described in the first and second embodiments, may be performed in advance. In other words, after a predetermined gain is imparted to the entire image in advance, gradation conversion in the image processing part may be performed.

Moreover, in the third and fourth embodiments, the first gradation converting part may use the same gamma curve in a case where the gradation compression mode is "weak" and in a case where the gradation compression mode is "medium". Similarly, the first gradation converting part may use the same gamma curve in a case where the gradation compression mode is "medium" and in a case where the gradation compression mode is "strong".

Moreover, in the third and fourth embodiments, the second gradation converting part may use the same parameters in a case where the gradation compression mode is "weak" and in a case where the gradation compression mode is "medium". Similarly, the second gradation converting part may use the same parameters in a case where the gradation compression mode is "medium" and in a case where the gradation compression mode is "strong".

Further, in the third and fourth embodiments, examples are described, in which all values of α, k(x), and k2(x) in parameter groups for use in the second gradation converting part, differ from each other according to a gradation compression mode, however, the present embodiments are not limited to these examples. Instead, all or part of values of at least one of α, k(x), and k2(x) may differ from each other according to the gradation compression mode. In other words, in addition to the combination shown in Table 3, cases (three kinds) where one of α, k(x), and k2(x) has a common value regardless of the gradation compression mode, and cases (three kinds) where two of α, k(x), and k2(x) have a respective common value regardless of the gradation compression mode, that are total seven kinds of cases, can be considered.

Moreover, in the third and fourth embodiments, although an image processing apparatus constituted of a computer is described as an example, the third and fourth embodiments can also be applied to an electronic camera, similarly to the first and second embodiments.

Moreover, in the first to fourth embodiments, examples where, when being set to be ON, the gradation compression mode can be set to three stages of "weak", "medium", and "strong", are described, however, the number of stages is not limited to these examples. Moreover, a configuration may be used in which any of "weak", "medium", and "strong" is automatically selected by each controlling part, or a configuration may be used in which instead of "weak", "medium", and "strong", no-stage strength is automatically determined. For example, a configuration may be used in which image data is divided into a plurality of regions, difference in brightness between a region with maximum brightness and a region with minimum brightness is obtained, and, according to the difference in brightness, the gradation compression mode is selected automatically, or the strength of the gradation compression mode is determined automatically.

Moreover, a configuration may be used in which a part or all of the inventions described in the first to fourth embodiments are combined appropriately. For example, a configuration may be used in which the third embodiment and the fourth embodiment are combined, and second gradation converting parts are provided before and behind the first gradation converting part, respectively. By such a configuration, it is possible to select any time of before and after being subjected to gradation conversion by the first gradation converting part and to perform gradation conversion by the second gradation converting part. Moreover, the gradation conversion by the second gradation converting part can be divided into two in view of influence with respect to the first gradation converting part, and gradation conversion by the second gradation converting part can be performed at both times of before and after being subjected to gradation conversion by the first gradation converting part.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. An image processing apparatus, comprising:
an inputting unit inputting an original image;
a first gradation converting unit generating a second image by performing gradation conversion on one of said original image input from said inputting unit and an image made up of a plurality of color components based on said original image, depending on each pixel value of one of said original image and said image made up of the color components based on said original image;
a second gradation converting unit generating a third image by performing gradation conversion on one of said second image and a linearly-transformed image of said second image, based on pixel values within a predetermined range from each pixel of one of said second image and said linearly-transformed second image;
a selecting unit selecting any gradation conversion mode from among a plurality of predetermined gradation conversion modes; and
a determining unit determining a second gradation conversion parameter for use in gradation conversion by said second gradation converting unit, according to said gradation conversion mode selected by said selecting unit, and determining at least one of a first gradation conversion parameter for use in gradation conversion by said first gradation converting unit and an exposure amount in an exposure amount adjusting part which can adjust the exposure amount, according to said gradation conversion mode selected by said selecting unit.

2. The image processing apparatus according to claim 1, wherein
said determining unit determines said second gradation conversion parameter and said first gradation conversion parameter, according to said gradation conversion mode selected by said selecting unit.

3. The image processing apparatus according to claim 2, wherein
said determining unit determines said second gradation conversion parameter, said first gradation conversion parameter, and said exposure amount, according to said gradation conversion mode selected by said selecting unit.

4. The image processing apparatus according to claim 3, wherein
said selecting unit selects any gradation conversion mode from among said plurality of gradation conversion modes, based on a subject image of said original image.

5. The image processing apparatus according to claim 2, wherein
said second gradation converting unit performs gradation conversion using a gain curve, and
said determining unit determines said gain curve as said second gradation conversion parameter.

6. An imaging apparatus, comprising:
an image processing apparatus according to claim 1; and
an exposure amount adjusting unit which can adjust an exposure amount, wherein
said determining unit determines said second gradation conversion parameter and the exposure amount in said exposure amount adjusting unit, according to said gradation conversion mode selected by said selecting unit.

7. An imaging apparatus, comprising
an image processing apparatus according to claim 1, wherein:
said determining unit determines said second gradation conversion parameter and said first gradation conversion parameter, according to said gradation conversion mode selected by said selecting unit;
said first gradation converting unit performs gradation conversion using said first gradation conversion parameter determined by said determining unit; and
said second gradation converting unit performs gradation conversion using said second gradation conversion parameter determined by said determining unit.

8. A non-transitory computer-readable storage medium used to execute an image processing program, comprising:
an inputting operation inputting an original image;
a first gradation converting operation generating a second image by performing gradation conversion on one of said original image input from said inputting unit and an image made up of a plurality of color components based on said original image, depending on each pixel value of one of said original image and said image made up of the color components based on said original image;

a second gradation converting operation generating a third image by performing gradation conversion on one of said second image and a linearly-transformed image of said second image, based on pixel values within a predetermined range from each pixel of one of said second image and said linearly-transformed second image;

a selecting operation selecting any gradation conversion mode from among a plurality of predetermined gradation conversion modes; and a determining operation determining a second gradation conversion parameter for use in gradation conversion at said second gradation converting operation, according to said gradation conversion mode selected at said selecting operation, and determining at least one of a first gradation conversion parameter for use in gradation conversion at said first gradation converting operation and an exposure amount in an exposure amount adjusting part which can adjust the exposure amount, according to said gradation conversion mode selected at said selecting operation.

9. An image processing apparatus, comprising:

a first gradation converting unit performing gradation conversion on a first input image, depending on each pixel value of the said first input image;

a second gradation converting unit performing gradation conversion on a second input image based on pixel values within a predetermined range from each pixel of said second input image;

a selecting unit selecting any gradation conversion mode from among a plurality of predetermined gradation conversion modes; and a determining unit determining a second gradation conversion parameter for use in gradation conversion by said second gradation converting unit, according to said gradation conversion mode selected by said selecting unit, and determining at least one of a first gradation conversion parameter for use in gradation conversion by said first gradation converting unit and an exposure amount in an exposure amount adjusting part which can adjust the exposure amount, according to said gradation conversion mode selected by said selecting unit, wherein said second input image is an image made up of brightness Y, color difference Cr, and color difference Cb, and said second gradation conversion parameter is a value $\alpha$, a gain $k(x)$, and a gain $k2(x)$ when a value related to a pixel is V and a value generated from said value V by performing low-pass filter processing on said second input image is VL, in which said value V is expressed in a linear sum of brightness Y, color difference Cr, and color difference Cb of the pixel;

when a pixel value x of a target pixel of gradation conversion by said second gradation converting unit is expressed in a linear sum of brightness Y, color difference Cr, color difference Cb, and value VL, said value $\alpha$ is a value related to a coefficient of brightness Y and a coefficient of the value VL of the linear sum;

said gain $k(x)$ is a gain to be multiplied on said brightness Y at the time of gradation conversion by said second gradation converting unit and takes said pixel value x of said target pixel of gradation conversion by said second gradation converting unit as a parameter; and said gain $k2(x)$ is a gain to be multiplied on said color difference Cr and said color difference Cb at the time of gradation conversion by said second gradation converting unit and takes said pixel value x of said target pixel of gradation conversion by said second gradation converting unit as a parameter.

10. An image processing apparatus, comprising:

a first gradation converting unit performing gradation conversion on a first input image, depending on each pixel value of the said first input image;

a second gradation converting unit performing gradation conversion on a second input image based on pixel values within a predetermined range from each pixel of said second input image;

a selecting unit selecting any gradation conversion mode from among a plurality of predetermined gradation conversion modes; and a determining unit determining a second gradation conversion parameter for use in gradation conversion by said second gradation converting unit, according to said gradation conversion mode selected by said selecting unit, and determining at least one of a first gradation conversion parameter for use in gradation conversion by said first gradation converting unit and an exposure amount in an exposure amount adjusting part which can adjust the exposure amount, according to said gradation conversion mode selected by said selecting unit, wherein said second input image is an image made up of brightness $Y[i,j]$, color difference $Cr[i,j]$, and color difference $Cb[ij]$ where $[i,j]$ is a position in said second input image;

a pixel value $x[ij]$ of the position $[i,j]$ in said second input image is expressed in $x[i,j]=\alpha*Y[i,j]+a2*|Cr[i,j]|+a3*|Cb[i,j]|+(1-\alpha)*VL[i,j]$, where a2 and a3 are coefficients, in which $VL[i,j]$ is a blurred image of $V[i,j]$ subjected to low-pass filter processing, and $V[i,j]$ is expressed in $V[i,j]=Y[i,j]+b2*|Cr[i,j]|+b3*|Cb[i,j]|$ or $V[i,j]=Y[i,j]+b2*Cr[i,j]+b3*Cb[i,j]$, where b2 and b3 are coefficients;

an image obtained as a result of performing gradation conversion on said second input image by said second gradation converting unit is made up of brightness $Y'[i,j]$, color difference $Cr'[i,j]$, and color difference $Cb'[i,j]$ which are expressed in following formulas $$Y'[i,j]=Y[i,j]*k(x[i,j])$$

$$Cr'[i,j]=Cr[i,j]*k2(x[i,j])$$

$$Cb'[i,j]=Cb[i,j]*k2(x[i,j]); \text{ and}$$

said second gradation conversion parameter is said $\alpha$, said gain $k(x[i,j])$, and said $k2(x[i,j])$.

11. The image processing apparatus according to claim 10, wherein said second input image is an image converted from an RGB image by following formulas $$Y=c1*R+c2*G+c3*B$$

$$Cr=R-Y$$

$$Cb=B-Y, \text{ where c1, c2 and c3 are coefficients.}$$

12. The image processing apparatus according to claim 9, wherein said second input image is an image obtained as a result of performing gradation conversion on said first input image by said first gradation converting unit or said first input image is an image obtained as a result of performing gradation conversion on said second input image by said second gradation converting unit.

13. The image processing apparatus according to claim 10, wherein said second input image is an image obtained as a result of performing gradation conversion on said first input image by said first gradation converting unit or said first input image is an image obtained as a result of performing gradation conversion on said second input image by said second gradation converting unit.

14. The image processing apparatus according to claim 11, wherein said second input image is an image obtained as a result of performing gradation conversion on said first input image by said first gradation converting unit or said first input image is an image obtained as a result of performing gradation conversion on said second input image by said second gradation converting unit.

15. A non-transitory computer-readable storage medium used to execute an image processing program, comprising:
   a first gradation converting unit performing gradation conversion on a first input image, depending on each pixel value of the said first input image;
   a second gradation converting unit performing gradation conversion on a second input image based on pixel values within a predetermined range from each pixel of said second input image;
   a selecting unit selecting any gradation conversion mode from among a plurality of predetermined gradation conversion modes; and
   a determining unit determining a second gradation conversion parameter for use in gradation conversion by said second gradation converting unit, according to said gradation conversion mode selected by said selecting unit, and determining at least one of a first gradation conversion parameter for use in gradation conversion by said first gradation converting unit and an exposure amount in an exposure amount adjusting part which can adjust the exposure amount, according to said gradation conversion mode selected by said selecting unit, wherein
   said second input image is an image made up of brightness Y, color difference Cr, and color difference Cb, and said second gradation conversion parameter is a value α, a gain k(x), and a gain k2 (x) when a value related to a pixel is V and a value generated from said value V by performing low-pass filter processing on said second input image is VL, in which said value V is expressed in a linear sum of brightness Y, color difference Cr, and color difference Cb of the pixel;
   when a pixel value x of a target pixel of gradation conversion by said second gradation converting unit is expressed in a linear sum of brightness Y, color difference Cr, color difference Cb, and value VL, said value α is a value related to a coefficient of brightness Y and a coefficient of the value VL of the linear sum;
   said gain k(x) is a gain to be multiplied on said brightness Y at the time of gradation conversion by said second gradation converting unit and takes said pixel value x of said target pixel of gradation conversion by said second gradation converting unit as a parameter; and
   said gain k2(x) is a gain to be multiplied on said color difference Cr and said color difference Cb at the time of gradation conversion by said second gradation converting unit and takes said pixel value x of said target pixel of gradation conversion by said second gradation converting unit as a parameter.

16. A non-transitory computer-readable storage medium used to execute an image processing program, comprising:
   a first gradation converting unit performing gradation conversion on a first input image, depending on each pixel value of the said first input image;
   a second gradation converting unit performing gradation conversion on a second input image based on pixel values within a predetermined range from each pixel of said second input image;
   a selecting unit selecting any gradation conversion mode from among a plurality of predetermined gradation conversion modes; and
   a determining unit determining a second gradation conversion parameter for use in gradation conversion by said second gradation converting unit, according to said gradation conversion mode selected by said selecting unit, and determining at least one of a first gradation conversion parameter for use in gradation conversion by said first gradation converting unit and an exposure amount in an exposure amount adjusting part which can adjust the exposure amount, according to said gradation conversion mode selected by said selecting unit, wherein
   said second input image is an image made up of brightness Y[i,j], color difference Cr[i,j], and color difference Cb[i,j] where [i,j] is a position in said second input image;
   a pixel value x[i,j] of the position [i,j] in said second input image is expressed in $x[i,j] = \alpha*Y[i,j]+a2*|Cr[i,j]|+a3*|Cb[i,j]|+(1-\alpha)*VL[i,j]$, where a2 and a3 are coefficients, in which
   VL[i,j] is a blurred image of V[i,j] subjected to low-pass filter processing, and V[i,j] is expressed in $V[i,j]=Y[i,j]b2*|Cr[i,j]|+b3*|Cb[i,j]|$ or $V[i,j]=Y[i,j]+b2*Cr[i,j]b3*Cb[i,j]$, where b2 and b3 are coefficients;
   an image obtained as a result of performing gradation conversion on said second input image by said second gradation converting unit is made up of brightness Y'[i,j], color difference Cr'[i,j], and color difference Cb'[i,j] which are expressed in following formulas $$Y'[i,j]=Y[i,j]*k(x[i,j])$$

$$Cr'[i,j]=Cr[i,j]*k2(x[i,j])$$

$$Cb'[i,j]=Cb[i,j]*k2(x[i,j]); \text{ and}$$

said second gradation conversion parameter is said α, said gain k(x[i,j]), and said k2(x[i,j]).

17. An image processing apparatus, comprising:
   an inputting unit inputting an original image;
   a second gradation converting unit generating a second image by performing gradation conversion on one of said original image input from said inputting unit and a linearly-transformed image of said original image, depending on pixel values of one of said original image and said linearly-transformed original image;
   a first gradation converting unit generating a third image by performing gradation conversion on one of said second image and an image made up of a plurality of color components based on said second image, depending on each pixel value of one of said second image and said image made up of the color components based on said second image;
   a selecting unit selecting any gradation conversion mode from among a plurality of predetermined gradation conversion modes; and
   a determining unit determining a second gradation conversion parameter for use in gradation conversion by said second gradation converting unit, according to said gradation conversion mode selected by said selecting unit, and determining at least one of a first gradation conversion parameter for use in gradation conversion by said first gradation converting unit and an exposure amount in an exposure amount adjusting part which can adjust the exposure amount, according to said gradation conversion mode selected by said selecting unit.

18. The image processing apparatus according to claim 17, wherein
said determining unit determines said second gradation conversion parameter and said first gradation conversion parameter, according to said gradation conversion mode selected by said selecting unit.

19. The image processing apparatus according to claim 18, wherein
said determining unit determines said second gradation conversion parameter, said first gradation conversion parameter, and said exposure amount, according to said gradation conversion mode selected by said selecting unit.

20. The image processing apparatus according to claim 19, wherein
said selecting unit selects any gradation conversion mode from among said plurality of gradation conversion modes, based on a subject image of said original image.

21. The image processing apparatus according to claim 18, wherein
said second gradation converting unit performs gradation conversion using a gain curve, and
said determining unit determines said gain curve as said second gradation conversion parameter.

22. An imaging apparatus, comprising:
an image processing apparatus according to claim 17; and
an exposure amount adjusting unit which can adjust an exposure amount, wherein
said determining unit determines said second gradation conversion parameter and the exposure amount in said exposure amount adjusting unit, according to said gradation conversion mode selected by said selecting unit.

23. An imaging apparatus, comprising
an image processing apparatus according to claim 17, wherein:
said determining unit determines said second gradation conversion parameter and said first gradation conversion parameter, according to said gradation conversion mode selected by said selecting unit;
said first gradation converting unit performs gradation conversion using said first gradation conversion parameter determined by said determining unit; and
said second gradation converting unit performs gradation conversion using said second gradation conversion parameter determined by said determining unit.

24. A non-transitory computer-readable storage medium used to execute an image processing program, comprising:
an inputting operation inputting an original image;
a second gradation converting operation generating a second image by performing gradation conversion on one of said original image input from said inputting unit and a linearly-transformed image of said original image, depending on pixel values of one of said original image and said linearly-transformed original image;
a first gradation converting operation generating a third image by performing gradation conversion on one of said second image and an image made up of a plurality of color components based on said second image, depending on each pixel value of one of said second image and said image made up of the color components based on said second image;
a selecting operation selecting any gradation conversion mode from among a plurality of predetermined gradation conversion modes; and
a determining operation determining a second gradation conversion parameter for use in gradation conversion at said second gradation converting operation, according to said gradation conversion mode selected at said selecting operation, and determining at least one of a first gradation conversion parameter for use in gradation conversion at said first gradation converting operation and an exposure amount in an exposure amount adjusting part which can adjust the exposure amount, according to said gradation conversion mode selected at said selecting operation.

* * * * *